(12) United States Patent
Chi et al.

(10) Patent No.: US 11,454,703 B2
(45) Date of Patent: Sep. 27, 2022

(54) METHODS AND SYSTEMS FOR TESTING AUTOMOTIVE RADAR USING RADAR DATA CUBE EMULATOR

(71) Applicant: Baidu USA LLC, Sunnyvale, CA (US)

(72) Inventors: Mei-Li Chi, Sunnyvale, CA (US); Davy Huang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 169 days.

(21) Appl. No.: 16/998,271

(22) Filed: Aug. 20, 2020

(65) Prior Publication Data

US 2022/0057485 A1 Feb. 24, 2022

(51) Int. Cl.
*G01S 7/40* (2006.01)
*G01S 13/931* (2020.01)
*G01S 13/00* (2006.01)

(52) U.S. Cl.
CPC .......... *G01S 7/4056* (2013.01); *G01S 13/931* (2013.01); *G01S 7/4095* (2021.05)

(58) Field of Classification Search
None
See application file for complete search history.

(56) References Cited

U.S. PATENT DOCUMENTS

| | | | | |
|---|---|---|---|---|
| 5,457,463 | A * | 10/1995 | Vencel | G09B 9/54 342/170 |
| 5,528,522 | A * | 6/1996 | Delguercio | G01S 7/4052 703/13 |
| 9,575,161 | B1 * | 2/2017 | Haghighi | G01S 13/931 |
| 9,599,702 | B1 * | 3/2017 | Bordes | G01S 13/931 |
| 9,859,996 | B2 * | 1/2018 | Kennedy | H04B 17/3912 |
| 10,520,586 | B2 * | 12/2019 | Haghighi | G01S 7/4052 |
| 11,301,603 | B2 * | 4/2022 | Camps Raga | G06F 30/20 |
| 2006/0220950 | A1 * | 10/2006 | Morgan | G01R 29/105 342/194 |
| 2018/0231652 | A1 * | 8/2018 | Rao | G01S 13/931 |
| 2018/0349526 | A1 * | 12/2018 | Atsmon | G09B 9/04 |
| 2020/0319325 | A1 * | 10/2020 | Kong | G01S 7/4052 |
| 2021/0055383 | A1 * | 2/2021 | Lee | G01S 13/931 |

FOREIGN PATENT DOCUMENTS

| | | | | | |
|---|---|---|---|---|---|
| CN | 101295019 | A | * | 10/2008 | .......... G01S 7/02 |
| CN | 203773046 | U | * | 8/2014 | .......... G01S 7/40 |
| DE | 102014118624 | A1 | * | 6/2016 | .......... G01S 7/4052 |
| WO | WO2019/195872 | A1 | * | 10/2019 | .......... G01S 13/931 |

* cited by examiner

*Primary Examiner* — Bernarr E Gregory
(74) *Attorney, Agent, or Firm* — Womble Bond Dickinson (US) LLP (57) ABSTRACT

Methods and systems for generating and utilizing an emulated radar data cube are disclosed. An emulated radar transmission waveform is defined based on expected radar performance. A virtual real world scenario comprising one or more virtual target objects is constructed. The virtual target objects emulate reflection and scattering properties to an input radar wave of real world objects. Operations of radar transmit and receive channels including an antenna array and free space propagation are emulated to obtain emulated raw radar data. Data processing is performed on the emulated raw radar data to build an emulated radar data cube. The emulated radar data cube is utilized to test a radar perception algorithm.

20 Claims, 5 Drawing Sheets

METHODS AND SYSTEMS FOR TESTING AUTOMOTIVE RADAR USING RADAR DATA CUBE EMULATOR

TECHNICAL FIELD

Embodiments of the present disclosure relate generally to automotive sensors. More particularly, embodiments of the disclosure relate to methods and systems for emulating a radar output for testing.

BACKGROUND

Radar (also referred to as radio detection and ranging) is an object-detection system that uses radio waves to determine, among other things, the range, angle, or velocity of objects. It can be used, for example, to detect aircraft, ships, spacecraft, guided missiles, motor vehicles, weather formations, and terrain. Radars have been used in many applications, including autonomous driving systems (e.g., autonomous vehicle), air and terrestrial traffic control, air-defense systems, antimissile systems, aircraft anti-collision systems, ocean surveillance systems, and the like.

An automotive radar sends modulated electromagnetic waves and receives scattered energy from surrounding objects. The received energy is processed with fast Fourier transform (FFT) and presented as dense grids of points containing range, velocity, and angle information of all the processed FFT bins, referred to as radar data cube (RDC). In an automotive radar system, the radar data cube is post processed with multiple layers of algorithms to identify the points that may have come from interested surrounding objects (like cars/pedestrians) and group them to track their movement. Usually these layers of algorithms are tested and optimized through large amounts of road test data.

It is most common to mount the radar on a vehicle and drive the vehicle on the street to collect data. However, this requires hardware integration and a test vehicle to cover the entire development stage. It is costly and time consuming to maintain test vehicles and resources to collect a large quantity of data for optimization. Also, special corner cases need to be designed and staged, which requires more investment in hardware and engineering time. For firmware testing, it is usually done via test scripts that are irrelevant to actual radar data, which only test for logical operations on the radar level, not for the entire system.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment", "an embodiment", or "some embodiments" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, an emulated radar transmission waveform is defined based on expected radar performance. A virtual real world scenario comprising one or more virtual target objects is constructed. The virtual target objects emulate reflection and scattering properties to an input radar wave of real world objects. Operations of radar transmit and receive channels including an antenna array and free space propagation are emulated to obtain emulated raw radar data. Data processing is performed on the emulated raw radar data to build an emulated radar data cube. The emulated radar data cube is utilized to test at least one of: a radar perception algorithm, or radar integration in an automated driving system.

In one embodiment, the expected radar performance comprises one or more of: a maximum range, a range resolution, or an angle resolution. In one embodiment, the virtual target objects comprise one or more of: a virtual building, a virtual motor vehicle, a virtual cyclist, or a virtual pedestrian. In one embodiment, performing data processing on the emulated raw radar data comprises performing a three-dimensional fast Fourier transform (FFT) on the emulated raw radar data.

In one embodiment, to utilize the emulated radar data cube to test at least one of: the radar perception algorithm, or the radar integration in an automated driving system, post-processing is applied on the emulated radar data cube to obtain emulated raw point cloud data. The emulated raw point cloud data is converted into one or more emulated radar data user datagram protocol (UDP) packets. The emulated radar data UDP packets are fed into the automated driving system comprising the radar perception algorithm to generate a detection list using the radar perception algorithm. Whether one or more objects comprised in the detection list match the virtual target objects is determined. In response to determining the one or more objects comprised in the detection list match the virtual target objects, the radar perception algorithm is determined as verified.

In one embodiment, to utilize the emulated radar data cube to test at least one of: the radar perception algorithm, or the radar integration in an automated driving system, whether the emulated radar data UDP packets received by the automated driving system comprise data that match the emulated raw point cloud data is verified. Further, in addition or in the alternative, a binary conversion interface between a radar input interface and the automated driving system is verified. In one embodiment, the emulated radar transmission waveform is an emulated frequency-modulated continuous-wave (FMCW) waveform.

Figure 1:
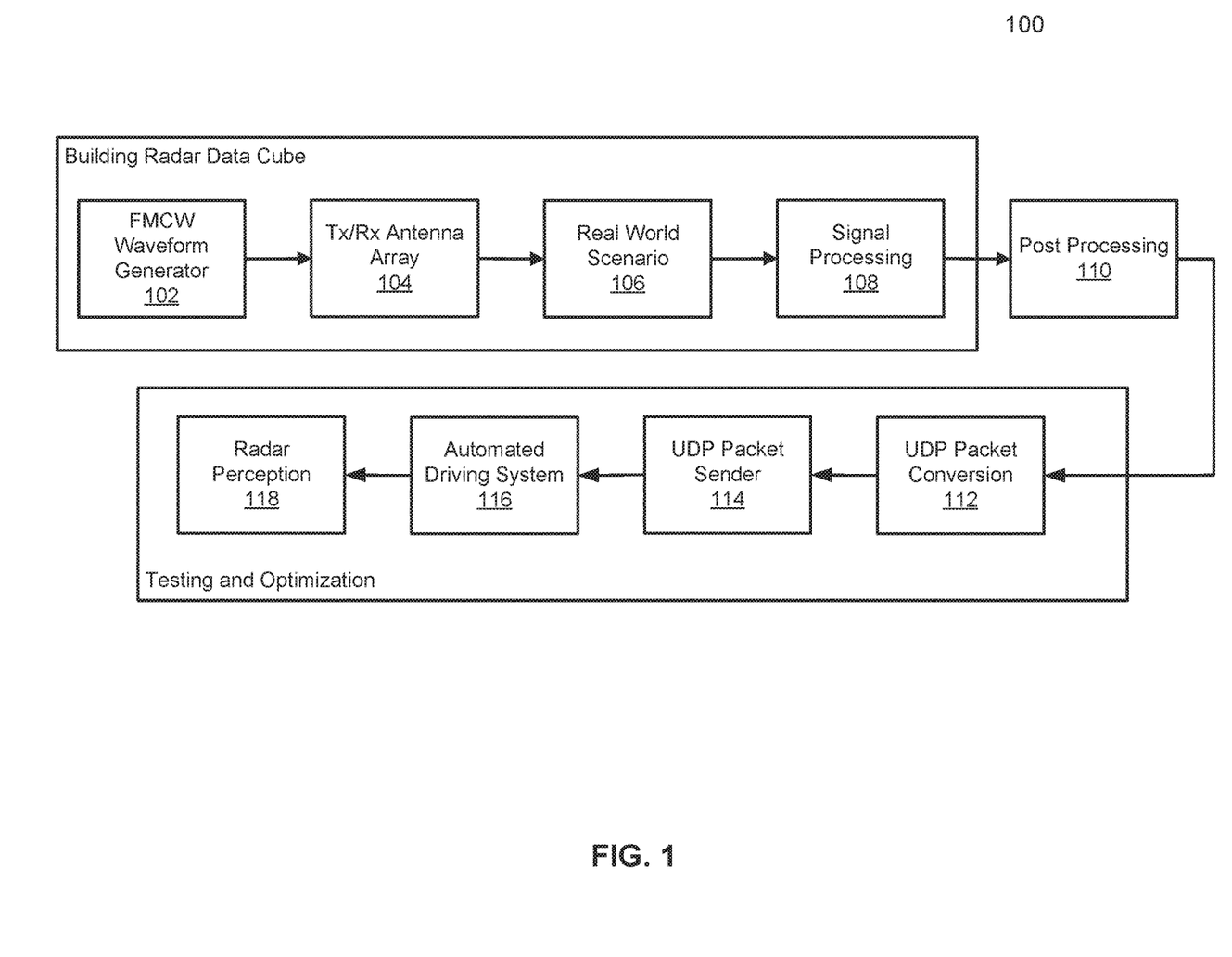
FIG. 1 is a block diagram illustrating a machine learning system.

FIG. 1 is a block diagram illustrating a radar perception algorithm test system 100. An FMCW waveform generator 102 generates a FMCW radar wave. The radar wave may be varied based on one or more of: a maximum range, a maximum velocity, a range resolution, or a velocity resolution. The radar wave is transmitted through the Tx/Rx antenna array 104, and is reflected and scattered by objects in the real world scenario 106. The reflected and scattered radar wave is at least partially received by the Tx/Rx antenna array 104, resulting a received radar signal. The Tx/Rx antenna array 104 is constructed based on an antenna pattern, has one or more Tx/Rx channels, and has a Tx/Rx spacing configuration. The real world scenario may comprise one or more of: a static environment, or one or more moving targets. The received radar signal undergoes signal processing 108, and a radar data cube is generated therefrom. The signal processing 108 comprises a three-dimensional fast Fourier transform (FFT), which may further comprise a range FFT and a Doppler FFT. It should be appreciated that the radar data cube is the data output from the radar that contains range, Doppler, and angle information.

The radar data cube then undergoes post-processing 110, and raw point cloud data is generated. The post-processing 110 may comprise one or more of: a constant false alarm rate (CFAR) detection, or a direction of arrival (DoA) estimation. The raw point cloud data is converted at UDP packet conversion 112 into radar data user datagram protocol (UDP) packets. The radar data UDP packets are sent by UDP packet sender 114 into the automated driving system 116. The UDP packet sender 114 may multicast the radar data UDP packets to the automated driving system 116. Thereafter, the radar perception algorithm 118 may generate a detection list comprising perceive or detected objects based on the radar data. Each detected object may be associated with range, Doppler, and azimuth angle information.

Figure 2:
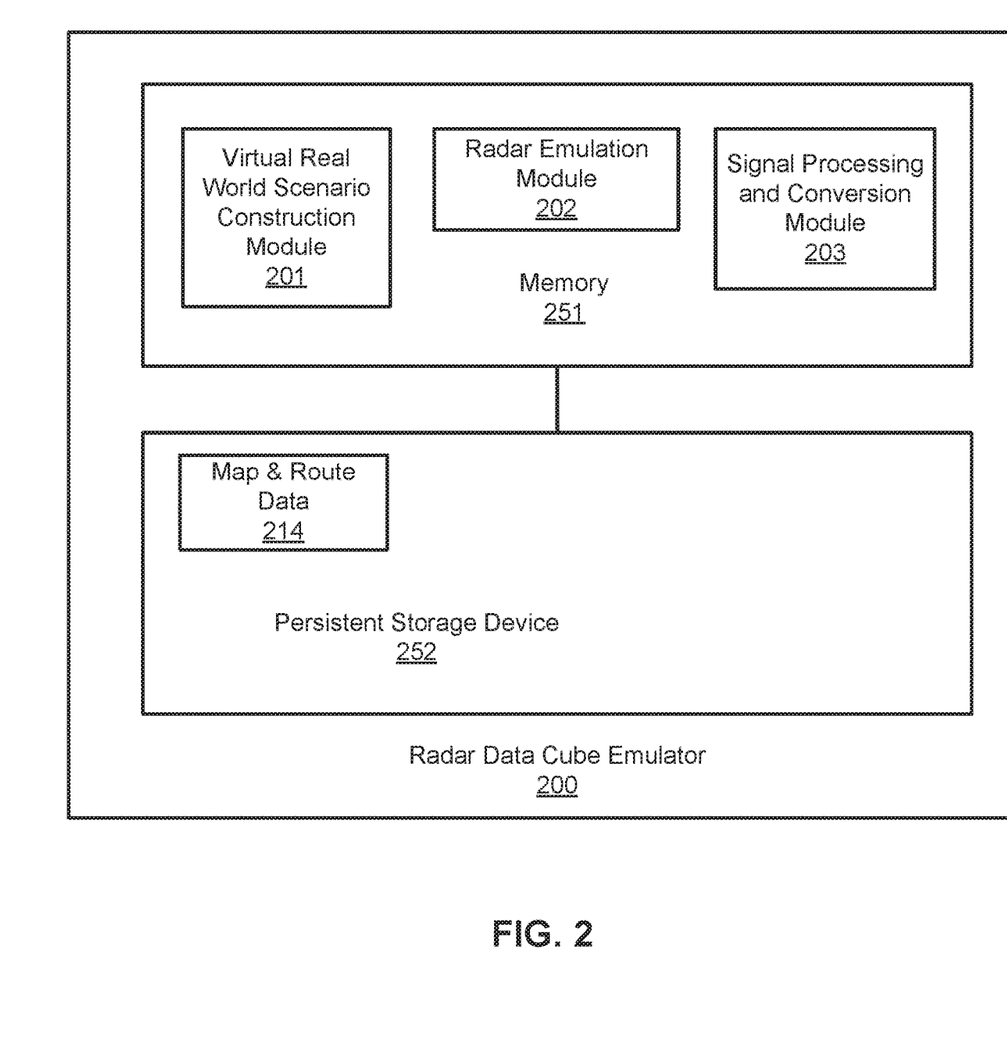
FIG. 2 is a block diagram illustrating an example of a radar data cube emulator according to one embodiment.

FIG. 2 is a block diagram illustrating an example of a radar data cube emulator 200 according to one embodiment. Referring to FIG. 2, radar data cube emulator 200 includes, but is not limited to, virtual real world scenario construction module 201, radar emulation module 202, and signal processing and conversion module 203. Radar data cube emulator 200 may be seen as a computing (or data processing) system that simulates the functionalities of a radar system or unit. Some or all of modules 201-203 may be implemented in software, hardware, or a combination thereof. For example, these modules may be installed in persistent storage device 252, loaded into memory 251, and executed by one or more processors (not shown). Note that some or all of modules 201-203 may be integrated together as an integrated module.

In one embodiment, at radar emulation module 202, an emulated radar transmission waveform is defined based on expected radar performance. In one embodiment, the expected radar performance comprises one or more of: a maximum range, a range resolution, or an angle resolution. In one embodiment, the emulated radar transmission waveform is an emulated frequency-modulated continuous-wave (FMCW) waveform. At virtual real world scenario construction module 201, a virtual real world scenario comprising one or more virtual target objects is constructed. The virtual target objects emulate reflection and scattering properties to an input radar wave of real world objects. In one embodiment, the virtual real world scenario may be constructed based on map and route data or information 214. In one embodiment, the virtual target objects comprise one or more of: a virtual building, a virtual motor vehicle, a virtual cyclist, or a virtual pedestrian. At virtual real world scenario construction module 201, operations of radar transmit and receive channels including an antenna array and free space propagation are emulated to obtain emulated raw radar data.

In particular, it should be appreciated that each of the types of the virtual target objects would have a corresponding different radar cross-section pattern. Based on the emulated FMCW wave of a target radar device and the particular transmit and receive antenna array configuration, a radar cross-section representing a particular obstacle can be generated. At signal processing and conversion module 203, data processing is performed on the emulated raw radar data to build an emulated radar data cube. In one embodiment, performing data processing on the emulated raw radar data comprises performing a three-dimensional fast Fourier transform (FFT) on the emulated raw radar data. The emulated radar data cube may then be utilized to test a radar perception algorithm, e.g., for its completeness and integrity.

In one embodiment, to utilize the emulated radar data cube to test at least one of: the radar perception algorithm, or the radar integration in an automated driving system, post-processing is applied on the emulated radar data cube to obtain emulated raw point cloud data. The emulated raw point cloud data is converted into one or more emulated radar data user datagram protocol (UDP) packets. The emulated radar data UDP packets are fed into the automated driving system comprising the radar perception algorithm to generate a detection list using the radar perception algorithm. Whether one or more objects comprised in the detection list match the virtual target objects is determined. In response to determining the one or more objects comprised in the detection list match the virtual target objects, the radar perception algorithm is determined as verified.

In one embodiment, to utilize the emulated radar data cube to test at least one of: the radar perception algorithm, or the radar integration in an automated driving system, whether the emulated radar data UDP packets received by the automated driving system comprise data that match the emulated raw point cloud data is verified. Verifying that the emulated radar data UDP packets received by the automated driving system comprise data that match the emulated raw point cloud data helps confirm that UDP packet conversion 112 and UDP packet sender 114 of FIG. 1 work as expected. Further, in addition or in the alternative, a binary conversion interface between a radar input interface and the automated driving system is verified. In one embodiment, the binary conversion interface may comprise post processing 110, UDP packet conversion 112, and UDP packet sender 114 of FIG. 1, etc. In one embodiment, the binary conversion interface may be considered verified when the one or more objects comprised in the detection list match the virtual target objects.

Figure 3:
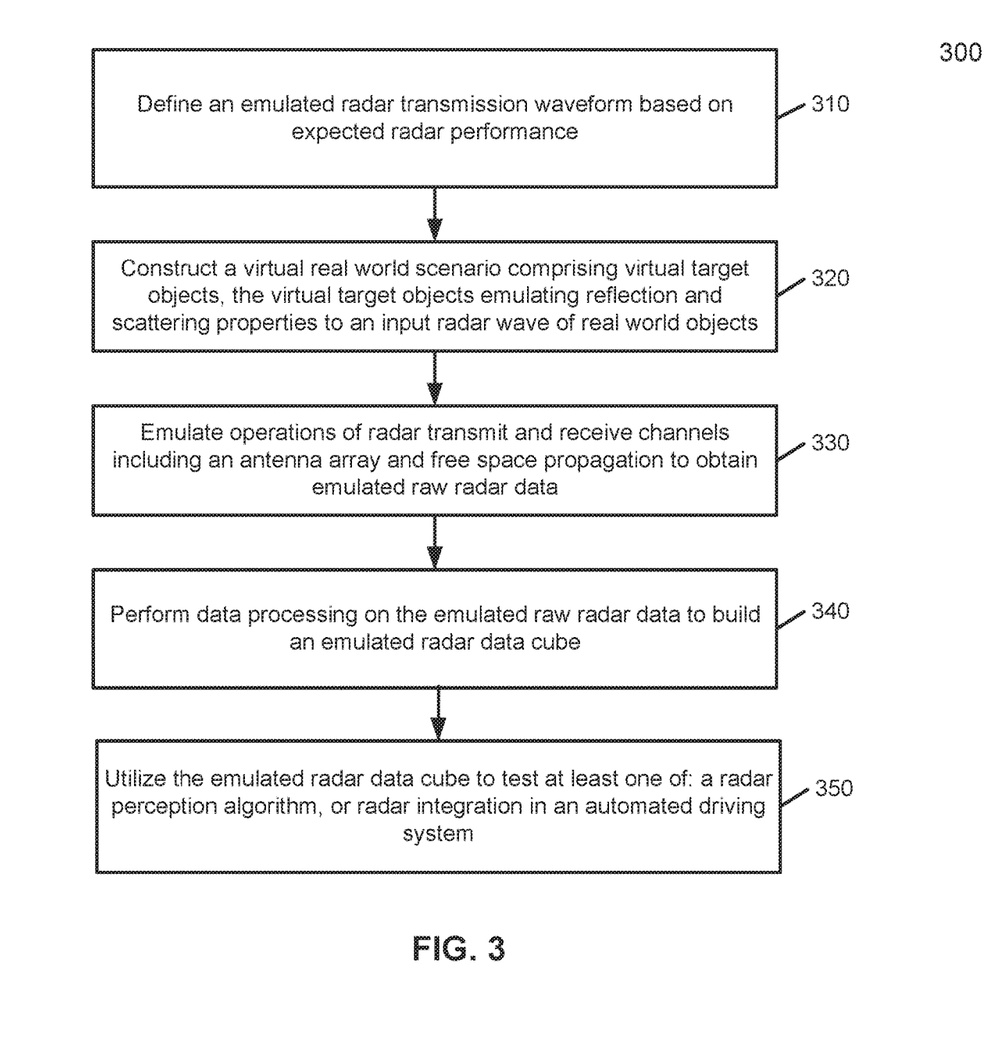
FIG. 3 is a flow diagram illustrating an example of a method for generating and utilizing an emulated radar data cube according to one embodiment.

FIG. 3 is a flow diagram illustrating an example of a method 300 for generating and utilizing an emulated radar data cube according to one embodiment. Process 300 may be performed by processing logic which may include software, hardware, or a combination thereof. At block 310, an emulated radar transmission waveform is defined based on expected radar performance. At block 320, a virtual real world scenario comprising one or more virtual target objects is constructed. The virtual target objects emulate reflection and scattering properties to an input radar wave of real world objects. At block 330, operations of radar transmit and receive channels including an antenna array and free space propagation are emulated to obtain emulated raw radar data. At block 340, data processing is performed on the emulated raw radar data to build an emulated radar data cube. At block 350, the emulated radar data cube is utilized to test at least one of: a radar perception algorithm, or radar integration in an automated driving system.

Figure 4:
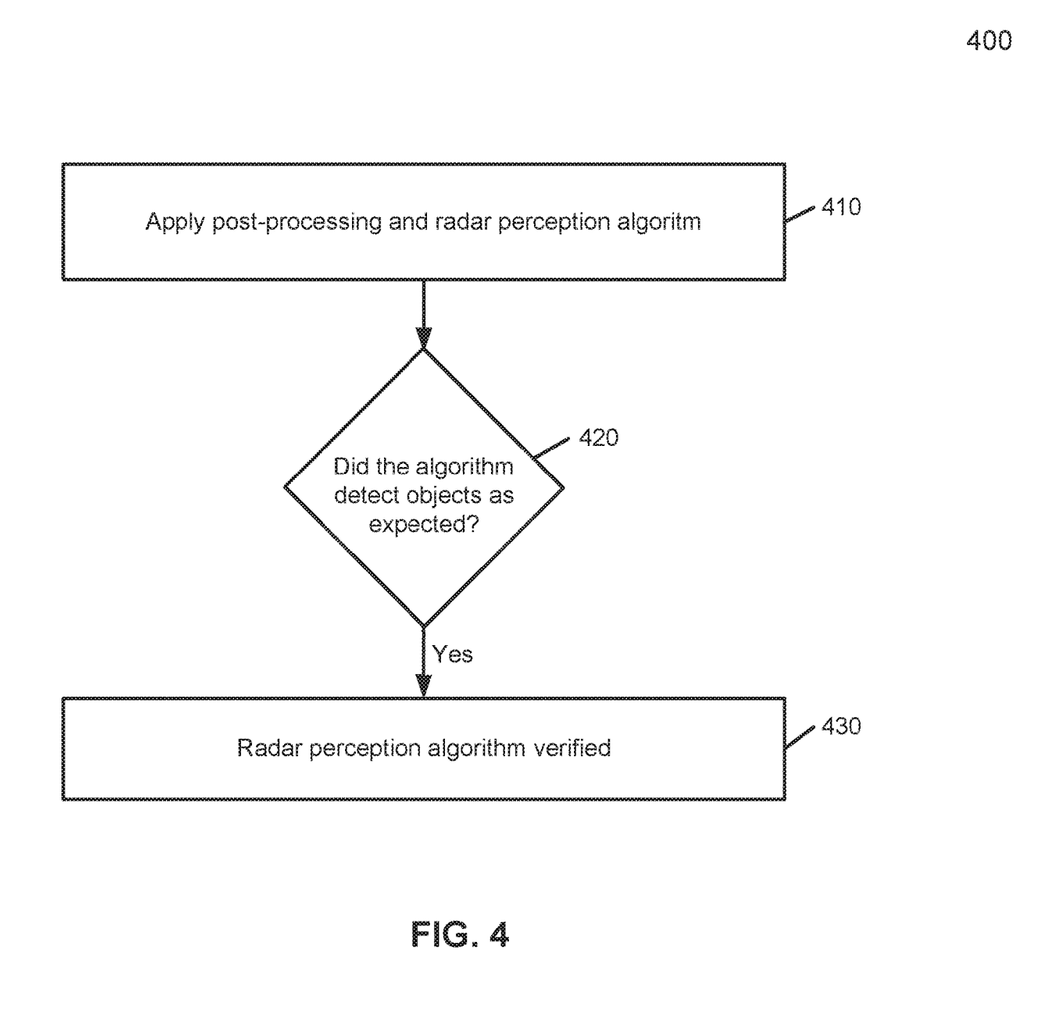
FIG. 4 is a flow diagram illustrating an example of a method for testing a radar perception algorithm according to one embodiment.

FIG. 4 is a flow diagram illustrating an example of a method 400 for testing a radar perception algorithm according to one embodiment. Process 400 may be performed by processing logic which may include software, hardware, or a combination thereof. At block 410, post-processing is applied to the emulated radar data cube. Accordingly, emulated raw point cloud data and radar data UDP packets may be generated. The radar perception algorithm may be applied to the processed emulated radar data to generate a detection list comprising detected or perceived objects. At block 420, whether the objects comprised in the detection list are as expected is determined. The objects are as expected when they match the virtual target objects that were utilized in the generation of the emulated radar data cube. If the objects in the detection list are as expected, at block 430, the radar perception algorithm is determined as verified.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, embodiments of the disclosure relate to an emulator that simulates road scenarios with a given radar design to output radar data cube, and feeds the emulated radar data cube into post processing algorithms for testing. A parametric emulated FMCW waveform generator design allows for customization based on the emulated target radar specification. The emulator constructs real world environment with objects based on their electromagnetic wave responses, and can easily create corner cases (e.g., sharp turns, small moving objects, etc.) or complex cases (e.g., a case where multiple moving pedestrians, cyclists, and motor vehicles are scattered along the path) to test algorithm completeness. Furthermore, the radar data cube emulator can be converted to output in binary data format (e.g., the same format used with Conti ARS430) that can directly integrate into an autonomous vehicle system in place of actual radar hardware. This can be used to test the integration of radar to the system on the firmware layer, and also created a test platform with multiple radars.

Figure 5:
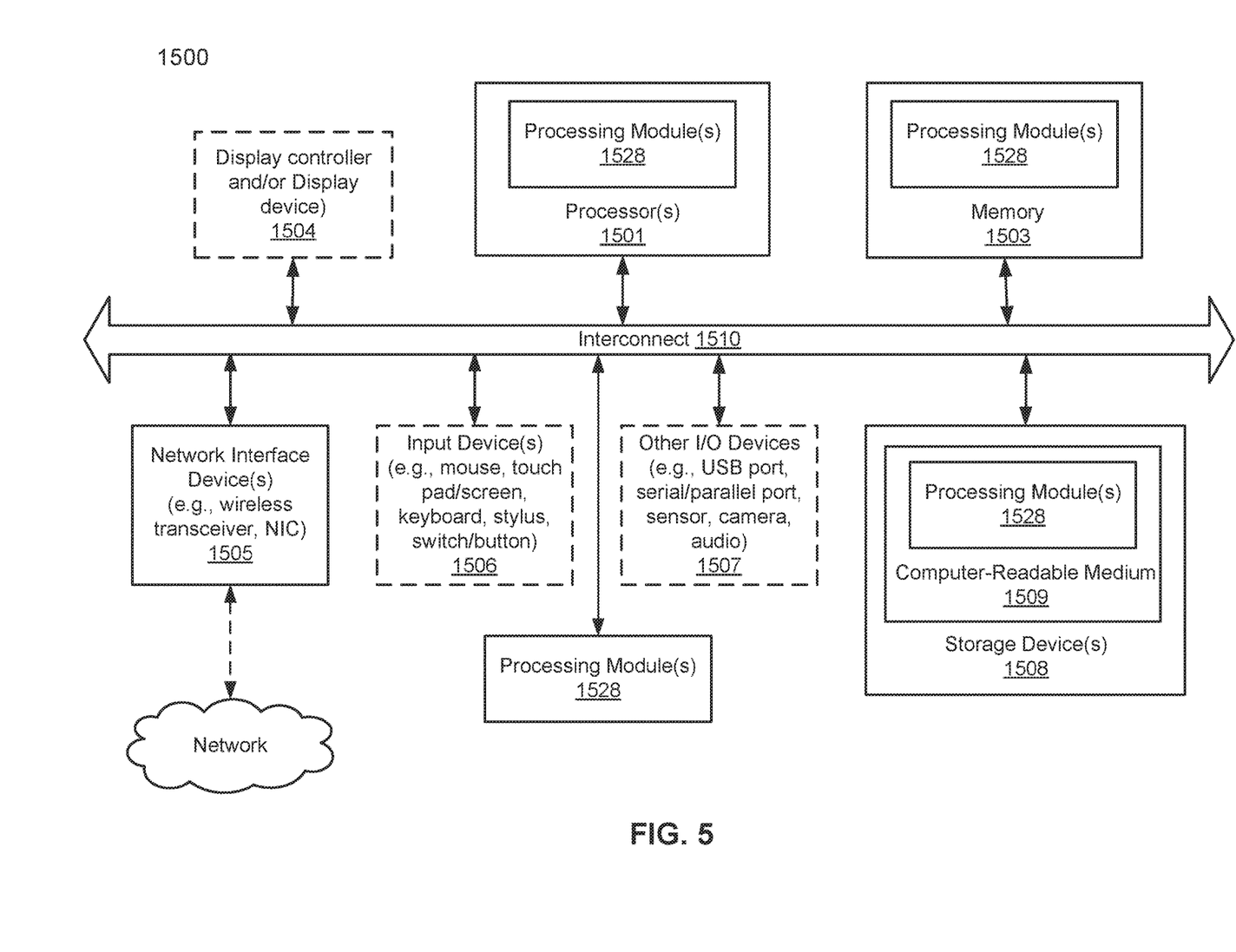
FIG. 5 is a block diagram illustrating a data processing system according to one embodiment.

FIG. 5 is a block diagram illustrating an example of a data processing system which may be used with one embodiment of the disclosure. For example, system 1500 may represent any of data processing systems described above performing any of the processes or methods described above, such as, for example, radar data cube emulator 200 of FIG. 2 and automated system of an autonomous driving vehicle (ADV). System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, scene definition module 201, scattering data generation module 202, and radar modeling module 203. Processing module/unit/logic 1528 may also represent any module/unit/logic performed by the perception and planning system of the ADV. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
    defining an emulated radar transmission waveform based on expected radar performance;
    constructing a virtual real world scenario comprising one or more virtual target objects, the virtual target objects emulating reflection and scattering properties to an input radar wave of real world objects;
    emulating operations of radar transmit and receive channels including an antenna array and free space propagation to obtain emulated raw radar data;
    performing data processing on the emulated raw radar data to build an emulated radar data cube; and
    utilizing the emulated radar data cube to test at least one of: a radar perception algorithm, or radar integration in an automated driving system.

2. The method of claim 1, wherein the expected radar performance comprises one or more of: a maximum range, a range resolution, or an angle resolution.

3. The method of claim 1, wherein the virtual target objects comprise one or more of: a virtual building, a virtual motor vehicle, a virtual cyclist, or a virtual pedestrian.

4. The method of claim 1, wherein performing data processing on the emulated raw radar data comprises performing a three-dimensional fast Fourier transform (FFT) on the emulated raw radar data.

5. The method of claim 1, wherein utilizing the emulated radar data cube to test at least one of: the radar perception algorithm, or the radar integration in the automated driving system further comprises:
    applying post-processing on the emulated radar data cube to obtain emulated raw point cloud data;
    converting the emulated raw point cloud data into one or more emulated radar data user datagram protocol (UDP) packets;
    feeding the emulated radar data UDP packets into the automated driving system comprising the radar perception algorithm to generate a detection list using the radar perception algorithm;
    determining whether one or more objects comprised in the detection list match the virtual target objects; and
    in response to determining the one or more objects comprised in the detection list match the virtual target objects, determining that the radar perception algorithm is verified.

6. The method of claim 5, wherein utilizing the emulated radar data cube to test at least one of: the radar perception algorithm, or the radar integration in the automated driving system further comprises at least one of:
    verifying whether the emulated radar data UDP packets received by the automated driving system comprise data that match the emulated raw point cloud data; or
    verifying a binary conversion interface between a radar input interface and the automated driving system.

7. The method of claim 1, wherein the emulated radar transmission waveform is an emulated frequency-modulated continuous-wave (FMCW) waveform.

8. A non-transitory machine-readable medium having instructions stored therein, which when executed by a processor, cause the processor to perform operations, the operations comprising:
    defining an emulated radar transmission waveform based on expected radar performance;
    constructing a virtual real world scenario comprising one or more virtual target objects, the virtual target objects emulating reflection and scattering properties to an input radar wave of real world objects;
    emulating operations of radar transmit and receive channels including an antenna array and free space propagation to obtain emulated raw radar data;
    performing data processing on the emulated raw radar data to build an emulated radar data cube; and
    utilizing the emulated radar data cube to test at least one of: a radar perception algorithm, or radar integration in an automated driving system.

9. The non-transitory machine-readable medium of claim 8, wherein the expected radar performance comprises one or more of: a maximum range, a range resolution, or an angle resolution.

10. The non-transitory machine-readable medium of claim 8, wherein the virtual target objects comprise one or more of: a virtual building, a virtual motor vehicle, a virtual cyclist, or a virtual pedestrian.

11. The non-transitory machine-readable medium of claim 8, wherein performing data processing on the emulated raw radar data comprises performing a three-dimensional fast Fourier transform (FFT) on the emulated raw radar data.

12. The non-transitory machine-readable medium of claim 8, wherein utilizing the emulated radar data cube to test at least one of: the radar perception algorithm, or the radar integration in the automated driving system further comprises:
  applying post-processing on the emulated radar data cube to obtain emulated raw point cloud data;
  converting the emulated raw point cloud data into one or more emulated radar data user datagram protocol (UDP) packets;
  feeding the emulated radar data UDP packets into the automated driving system comprising the radar perception algorithm to generate a detection list using the radar perception algorithm;
  determining the emulated radar data UDP packets received by the automated driving system received packets match the emulated raw point cloud data, determining a binary conversion interface between radar and automated driving system is accurate
  determining whether one or more objects comprised in the detection list match the virtual target objects; and
  in response to determining the one or more objects comprised in the detection list match the virtual target objects, determining that the radar perception algorithm is verified.

13. The non-transitory machine-readable medium of claim 12, wherein utilizing the emulated radar data cube to test at least one of: the radar perception algorithm, or the radar integration in the automated driving system further comprises at least one of:
  verifying whether the emulated radar data UDP packets received by the automated driving system comprise data that match the emulated raw point cloud data; or
  verifying a binary conversion interface between a radar input interface and the automated driving system.

14. The non-transitory machine-readable medium of claim 8, wherein the emulated radar transmission waveform is an emulated frequency-modulated continuous-wave (FMCW) waveform.

15. A data processing system, comprising:
  a processor; and
  a memory coupled to the processor to store instructions, which when executed by the processor, cause the processor to perform operations, the operations including
  defining an emulated radar transmission waveform based on expected radar performance;
  constructing a virtual real world scenario comprising one or more virtual target objects, the virtual target objects emulating reflection and scattering properties to an input radar wave of real world objects;
  emulating operations of radar transmit and receive channels including an antenna array and free space propagation to obtain emulated raw radar data;
  performing data processing on the emulated raw radar data to build an emulated radar data cube; and
  utilizing the emulated radar data cube to test at least one of: a radar perception algorithm, or radar integration in an automated driving system.

16. The data processing system of claim 15, wherein the expected radar performance comprises one or more of: a maximum range, a range resolution, or an angle resolution.

17. The data processing system of claim 15, wherein the virtual target objects comprise one or more of: a virtual building, a virtual motor vehicle, a virtual cyclist, or a virtual pedestrian.

18. The data processing system of claim 15, wherein performing data processing on the emulated raw radar data comprises performing a three-dimensional fast Fourier transform (FFT) on the emulated raw radar data.

19. The data processing system of claim 15, wherein utilizing the emulated radar data cube to test at least one of: the radar perception algorithm, or the radar integration in the automated driving system further comprises:
  applying post-processing on the emulated radar data cube to obtain emulated raw point cloud data;
  converting the emulated raw point cloud data into one or more emulated radar data user datagram protocol (UDP) packets;
  feeding the emulated radar data UDP packets into the automated driving system comprising the radar perception algorithm to generate a detection list using the radar perception algorithm;
  determining the emulated radar data UDP packets received by the automated driving system received packets match the emulated raw point cloud data, determining a binary conversion interface between radar and automated driving system is accurate
  determining whether one or more objects comprised in the detection list match the virtual target objects; and
  in response to determining the one or more objects comprised in the detection list match the virtual target objects, determining that the radar perception algorithm is verified.

20. The data processing system of claim 19, wherein utilizing the emulated radar data cube to test at least one of: the radar perception algorithm, or the radar integration in the automated driving system further comprises at least one of:
  verifying whether the emulated radar data UDP packets received by the automated driving system comprise data that match the emulated raw point cloud data; or
  verifying a binary conversion interface between a radar input interface and the automated driving system.

* * * * *